US011326928B2

(12) United States Patent
McClintock

(10) Patent No.: US 11,326,928 B2
(45) Date of Patent: *May 10, 2022

(54) PORTABLE VERIFICATION SYSTEM AND METHOD USED TO VERIFY AN IN-FIELD GAS FLOW METER

(71) Applicant: Big Elk Energy Systems, LLC, Tulsa, OK (US)

(72) Inventor: Dennis McClintock, Tulsa, OK (US)

(73) Assignee: Big Elk Energy Systems, LLC, Tulsa, OK (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/610,973

(22) PCT Filed: Nov. 3, 2017

(86) PCT No.: PCT/US2017/059892
§ 371 (c)(1),
(2) Date: Nov. 5, 2019

(87) PCT Pub. No.: WO2018/208329
PCT Pub. Date: Nov. 15, 2018

(65) Prior Publication Data
US 2020/0072654 A1 Mar. 5, 2020

Related U.S. Application Data

(63) Continuation-in-part of application No. 15/588,630, filed on May 6, 2017, now Pat. No. 10,222,252.

(51) Int. Cl.
*G01F 15/00* (2006.01)
*G01F 25/10* (2022.01)
*G01F 1/66* (2022.01)

(52) U.S. Cl.
CPC ............ *G01F 25/15* (2022.01); *G01F 15/005* (2013.01); *G01F 25/13* (2022.01); *G01F 1/66* (2013.01)

(58) Field of Classification Search
CPC .. G01F 25/0053; G01F 15/005; G01F 25/003; G01F 1/66
(Continued)

(56) References Cited

U.S. PATENT DOCUMENTS 1,492,204 A 4/1924 Clark
3,446,055 A 5/1969 Tuck et al.
(Continued)

OTHER PUBLICATIONS

Rudroff, "Onsite Proving of Gas Flow Meters", "http://asgmt.com/wp-content/uploads/pdf-docs/2011/1/M30.pdf", 2011, Publisher: Welker Flow Measurement Systems Inc.
(Continued)

*Primary Examiner* — John Fitzgerald
*Assistant Examiner* — Rodney T Frank
(74) *Attorney, Agent, or Firm* — GableGotwals

(57) ABSTRACT

Embodiments of a portable verification system (5) can move from one in-field gas flow meter location to another and temporarily connect downstream of a main pipeline's meter run or station. A control valve (19) of the portable verification system (5) allows volume measurement at different flow velocities to be verified. In some embodiments, the portable verification system (5) is connected to the meter run (13) and the main pipeline by a corresponding slip or linearly adjustable pipeline section (30/70). This section (30/70) can extend horizontally and vertically, as well as swivel to provide versatility when connecting in the field. Adaptor fittings may be used to connect the system (5) to the meter run (13) and main pipeline or a quick connect/disconnect (105) may be used. Downtime is limited to the time required
(Continued)

to complete a circuit between the meter run, portable verification system (5), and main pipeline.

21 Claims, 8 Drawing Sheets

(58) Field of Classification Search
USPC .......................................................... 73/1.16
See application file for complete search history.

(56) References Cited

U.S. PATENT DOCUMENTS

| | | | |
|---|---|---|---|
| 3,958,443 | A | 5/1976 | Berrettini |
| 4,106,328 | A | 8/1978 | Neeff |
| 4,646,575 | A | 3/1987 | O'Hair et al. |
| 4,821,557 | A | 4/1989 | Beeson, III |
| 5,060,514 | A | 10/1991 | Aylsworth |
| 5,207,088 | A | 5/1993 | Geery |
| 5,421,188 | A | 6/1995 | Sager |
| 5,895,863 | A | 4/1999 | Glaudel et al. |
| 6,471,249 | B1 | 10/2002 | Lewis |
| 6,629,447 | B1 | 10/2003 | Collins |
| 6,721,674 | B2 | 4/2004 | Borzsonyi |
| 7,475,586 | B2 | 1/2009 | Swanek |
| 7,685,861 | B2 | 3/2010 | Lynch et al. |
| 7,942,068 | B2 | 5/2011 | Ao et al. |
| 8,302,455 | B2 | 11/2012 | Straub, Jr. |
| 8,816,866 | B2 | 8/2014 | Day |
| 9,010,196 | B2 | 4/2015 | Kurth et al. |
| 9,316,517 | B2 | 4/2016 | Forbes et al. |
| 2009/0205400 | A1 | 8/2009 | McPeak |
| 2013/0080080 | A1 | 3/2013 | Forbes et al. |
| 2013/0179374 | A1 | 7/2013 | Hains et al. |
| 2013/0340519 | A1 | 12/2013 | Kurth et al. |

OTHER PUBLICATIONS

Bowles Jr., "IN-Situ (ON-Site) Gas Meter Proving", 87th Annual International of Hydrocarbon Measurement 2012, vol. 1 of 2, Oklahoma City, Oklahoma.

Haner, "Ultrasonic Flow Meter Calibration", TransCanada Calibrations, http://asgmt.com/wp-content/uploads/pdf-docs/2009/1/046.pdf.

Meter run; Academic Press Diet of Science & Tech, Morris, Elsevier Science & Tech; 1992 Credo Reference, http://search.credoreference.com/content/entry/apdst/meter_run/O.

FMC; Multipath Ultrasonic Gas Flow Meter, Flow Calibration Procedure; Oct. 2009; info.smithmeter.com/literature/docs/mnks013.pdf.

US 11,326,928 B2

PORTABLE VERIFICATION SYSTEM AND METHOD USED TO VERIFY AN IN-FIELD GAS FLOW METER

BACKGROUND

This disclosure relates to gas flow measurement equipment and, in particular, to equipment, systems, and methods designed to improve the accuracy of gas flow measurement used in custody transfer transactions along a gas pipeline.

Natural gas transmission pipelines, like those used in interstate transmission, are typically 6 inches or larger in diameter. Connected to these pipelines are in-field gas flow meter runs. These runs may include an ultrasonic gas flow meter that is used to measure the transfer of gas flowing along these lines between pipeline companies. Other runs may include a turbine or orifice meter. Regardless of the type of meter, the meter's accuracy may erode over time.

Because of the tremendous volume of gas being transferred between pipeline companies, small measurement errors can have very large financial effects. Therefore, the in-field gas flow meters should be calibrated from time-to-time. However, doing this calibration requires shutting down flow through the pipeline, removing the meter run from the line, see FIG. 1, and sending the meter run to a calibration laboratory that makes use of a reference bank of meters. See e.g., FMC Technologies, Multipath Ultrasonic Gas Flow Meter: Flow Calibration Procedure at pp. 4, 8, 28 (October 2009) (accessed Sep. 22, 2017 at http://info.smithmeter-.com/literature/docs/mnks013.pdf); Wayne Haner, Ultrasonic Flow Meter Calibration: Consideration and Benefits at FIG. 7, p. 1, col. 1, para. 3, & p. 2, col. 1, last para. (TransCanada Calibrations, 2009) (accessed Sep. 22, 2017 at http://asgmt.com/wp-content/uploads/pdf-docs/2009/1/046.pdf).

Until the calibrated field meter is returned from the laboratory, which is typically a week or more, and reinstalled in the line, no gas is flowing through the line. The cost and lost revenue associated with this shutdown prevents many pipeline owners from calibrating the meter as often as it should be calibrated.

SUMMARY

Embodiments of a portable verification system can move from one in-field gas flow meter location to another in-field gas flow meter location and temporarily connect downstream of a main pipeline's meter run or station. A same volume of gas that passes through the field meter also passes through a calibrated ultrasonic gas flow meter (the reference meter) of the portable verification system before the volume of gas reenters the main pipeline. A control valve of the portable verification system allows volume measurement at different flow velocities to be verified. The volume of gas measured by the field meter is then compared with that of the portable verification system's calibrated meter. The field meter or its data can then be adjusted as needed.

In some embodiments, the portable verification system is connected to the meter run and the main pipeline by linearly adjustable pipeline sections. These sections can be arranged to extend horizontally and vertically, as well as swivel to provide versatility when connecting in the field. Adaptor fittings having one flange sized for and fitted to the inlet and outlet ends of the portable verification system and another flange sized for the meter run or main pipeline connection provide additional versatility. In other embodiments, the portable verification system is connected to the meter run and the main pipeline by a quick connect/disconnect.

After the field meter is verified to a desired level of accuracy, the portable verification system can be disconnected and the meter run reconnected to the main pipeline. The portable verification system can then be transported to another field location. If a decision is made to send the field meter to a calibration lab for calibration, the portable verification system can remain in place until the newly calibrated field meter is returned and reinstalled in the meter run.

ELEMENTS AND NUMBERING USED IN THE DRAWINGS AND DETAILED DESCRIPTION

Figure 1:
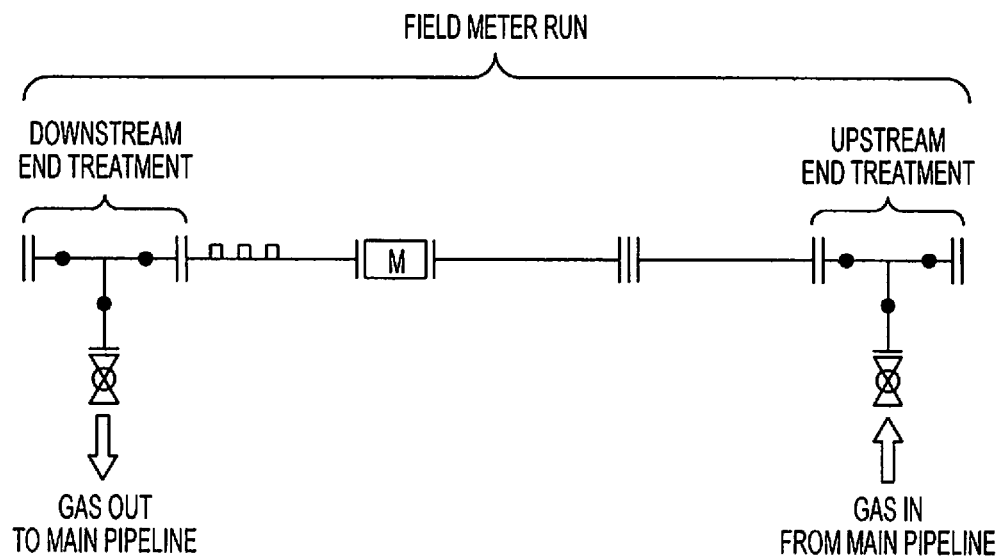
FIG. 1 is a schematic of a prior art field meter run connected to a main pipeline. When the in-field gas flow meter of the run requires calibration or verification, the main pipeline must be shut down to remove the field meter and remain shut down until the meter is returned from a calibration lab and reinstalled.

5 Portable verification system
13 Reference measurement section or meter run
11 Inlet end
10 Pipe 15 Calibrated ultrasonic gas flow meter (reference meter)
17 Turn
19 Control valve
21 Outlet end
23 Measurement trailer
30 First slip or linear adjustable pipeline section (horizontal)
31 End (inlet or outlet depending on direction of flow)
33 Outer pipe
35 End
37 Inner pipe
41 End (inlet or outlet depending on direction of flow)
43 Lift eye
45 Elbow
47 Lift eye
49 Lap joint flange
50 Sealing means
51 Slip joint or slip joint adaptor
53 Packing gland
55 Head
57 Pocket
59 O-ring
61 Spacer
63 Follower or pusher
70 Second slip linear adjustable pipeline section (vertical)
90 Adaptor
91 Flange
93 First end
95 Bolt hole pattern
97 Flange
99 Second end
101 Bolt hole pattern
105 Quick connect/disconnect
107 First end
109 First (outlet) lateral
111 Connection to 11
113 Isolation device
119 Second (inlet) lateral
121 Connection to 21
127 Second end
130 Air spring
131 U-bolt
135 Mounting bracket
M Field meter (meter under test)

DETAILED DESCRIPTION

Figure 2:
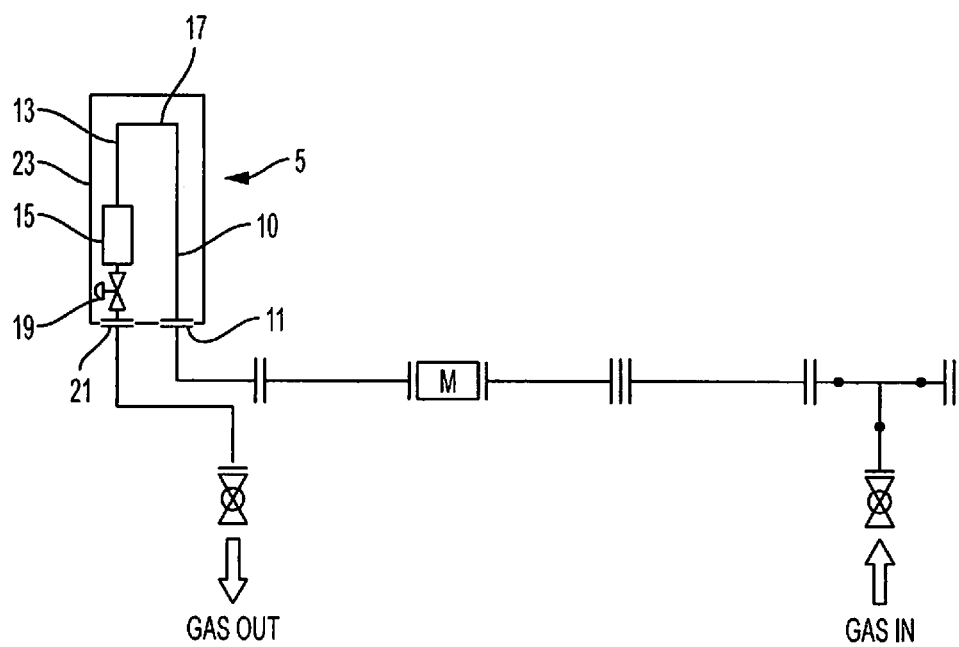
FIG. 2 is a schematic of an embodiment of portable verification system when connected to a downstream end of the field meter run. Gas flows through the field meter run and through a calibrated ultrasonic gas flow meter of the portable verification system before returning to the main pipeline. The main pipeline is shut down only for the amount of time required to complete a circuit between the field meter run, the portable verification system, and the main pipeline.

Referring now to FIG. 2, in embodiments of a portable verification system 5 a reference measurement section or meter run 15 is trailered to a main pipeline transporting gas and connected downstream of the main pipeline's meter run or station. In some embodiments, the portable verification system 5 is mounted on a measurement trailer 23. The trailer 23 may be no wider than a standard flatbed trailer (about 102 inch/259.08 cm in width). The amount of downtime experienced by the main pipeline is limited to the amount of time needed to complete a circuit between a downstream end of the field meter run, the portable verification system 5, and the main pipeline. In some embodiments, this circuit can be completed in less than 12 hours, less than 10 hours, or less than 8 hours. Disconnection of the system 5 and reconnection of the field meter run to the main pipeline may be accomplished in similar time frames.

The reference meter run 13 includes an inlet end 11 connectable to an end treatment of the field meter run, an outlet end 21 connectable to a flanged connection fitting of the main pipeline, and a calibrated ultrasonic gas flow meter (the reference meter) 15 located between the inlet end and outlet ends 11, 21. Gas flowing through the field meter M enters the portable verification system 5 and flows through the calibrated ultrasonic flow meter 15. The gas then flows back into the main pipeline.

The reference meter run 13 may include at least one turn 17 between the ends 11, 21 and can be arranged in some embodiments as a U-shaped or C-shaped run. In embodiments, the reference meter run 13 also may include a flow conditioner located ahead of the meter 15. The run 13 may also include means to attenuate ultrasonic waves and prevent their return toward, and interference with, the meter 15. Those means include elbows and blind flanges.

The pipe 10 used in the portable verification system 5 can be the same diameter as that of the main pipeline's meter run. For example, if the field meter run uses 12-inch (30.48 cm) pipe, system 5 can use 12-inch (30.48 cm) pipe. In other embodiments, a different size (larger or smaller) pipe. Where different size pipe is used, appropriate adjustments are made to equate the volume of gas flowing per unit time through the field meter M with that flowing through the calibrated ultrasonic gas flow meter 15. In other words, the calibrated reference meter 15 experiences the same volume of gas the field meter M experiences at either the same velocity as the field meter M or at a proportional velocity. Because the meter 15 is located downstream of the field meter M, the flow through the field meter M is an unadulterated flow, unaffected by the presence of the portable verification system 5.

A control valve 19 may be installed downstream of the calibrated ultrasonic gas flow meter 15, such as between the meter 15 and the outlet end 21, to restrict flow through the valve 19 and drop flow velocity through the field meter M by way of backpressure. For example, if the flow is 55 fps (16.76 mps) through the field meter M, flow can be restricted through the valve 19 to drop the flow to rates below 55 fps (16.76 mps) and at or above 5 fps (1.52 mps). Depending on whether size-on-size piping is used, the calibrated ultrasonic flow meter 15 experiences the same or a proportional velocity through it. In some embodiments, at least three different flow rates are selected, with corresponding volume measurement data provided for verification purposes.

Figure 3A:
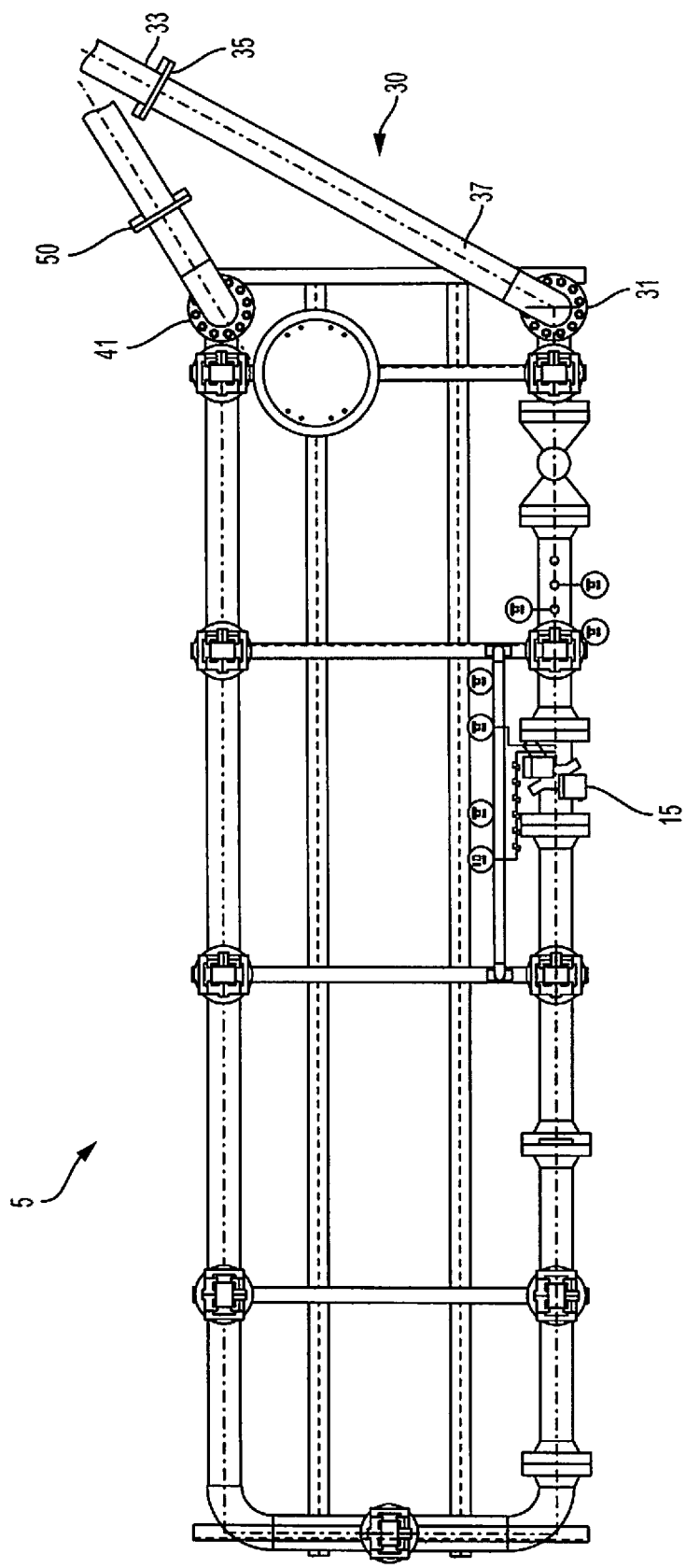
FIGS. 3A and 3B are a schematic of an embodiment of a portable verification system that includes a linearly adjustable pipeline section (see FIG. 3A) connecting the system to a field meter run of a main pipeline (see FIG. 3B). The adjustable pipeline section may be arranged to extend horizontally as well as vertically to make a connection between the portable verification system and a corresponding connection point of the field meter run or main pipeline.
Figure 3B:
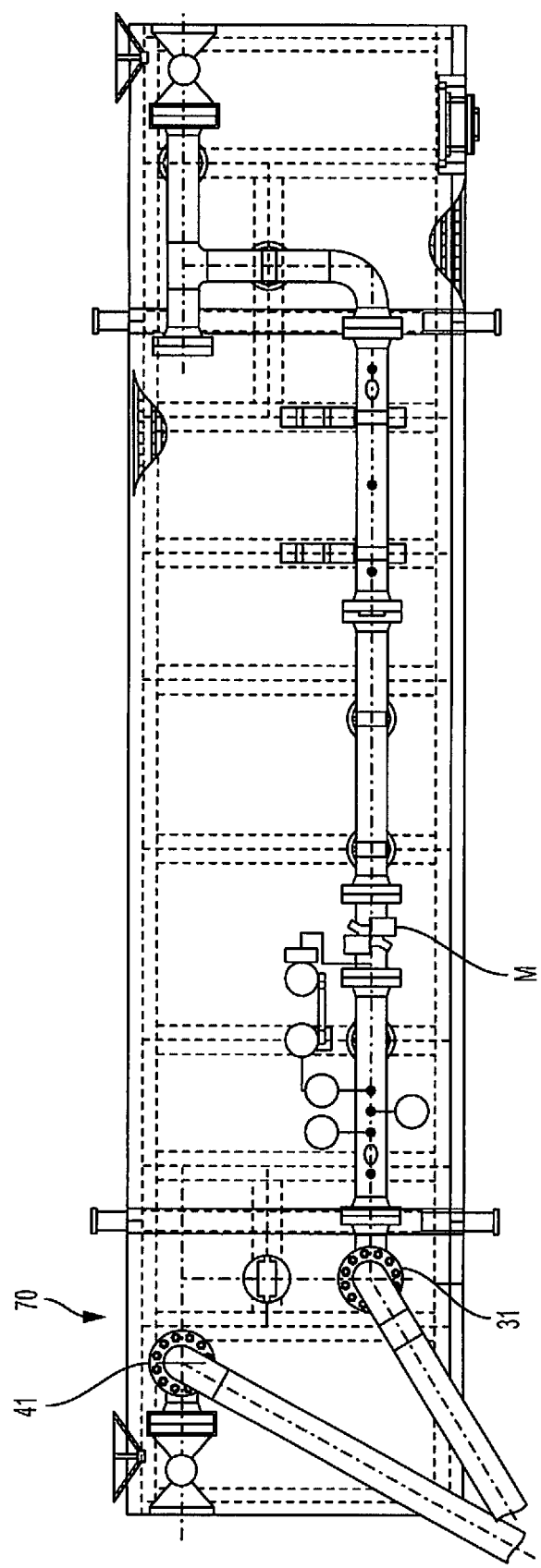
Figure 4:
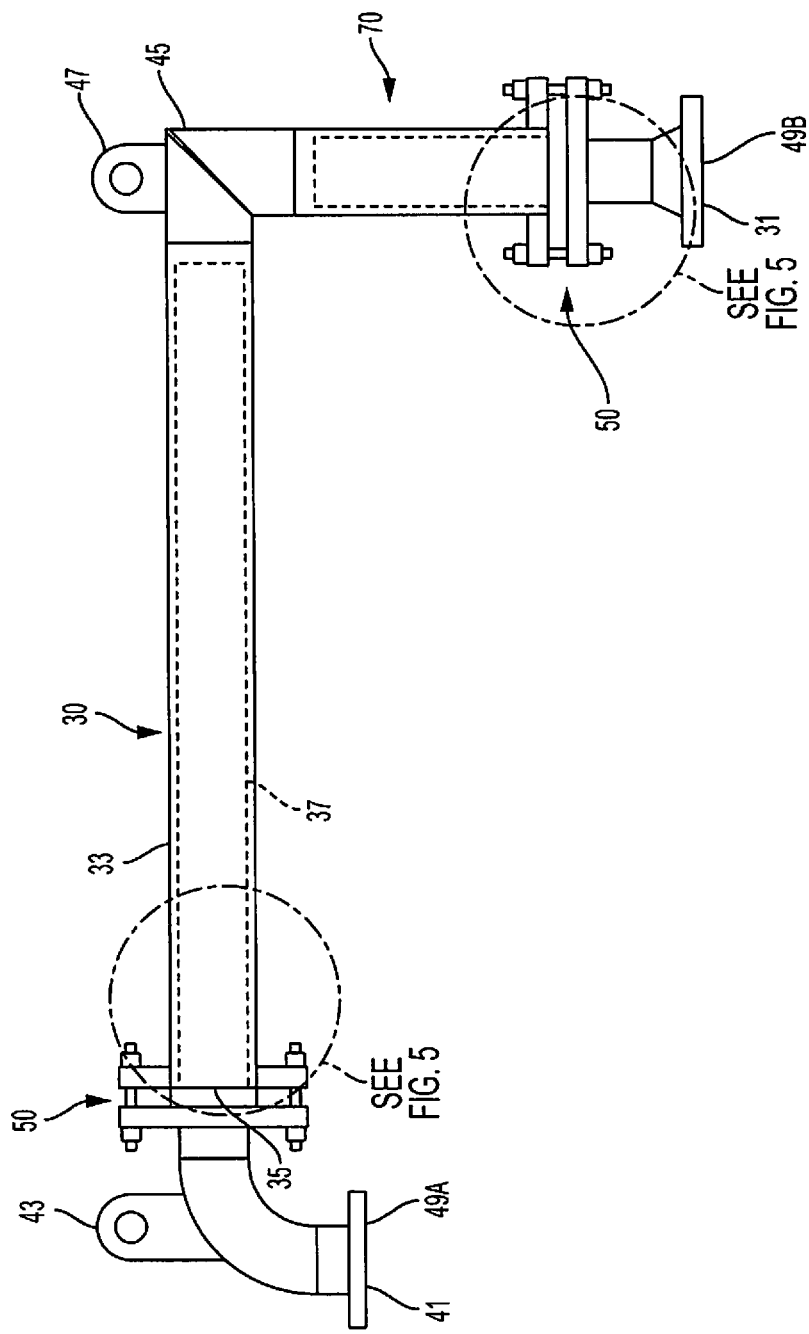
FIG. 4 is an embodiment of a slip joint adaptor that may be used to seal the linearly extendable pipeline section of FIG. 3.
Figure 5:
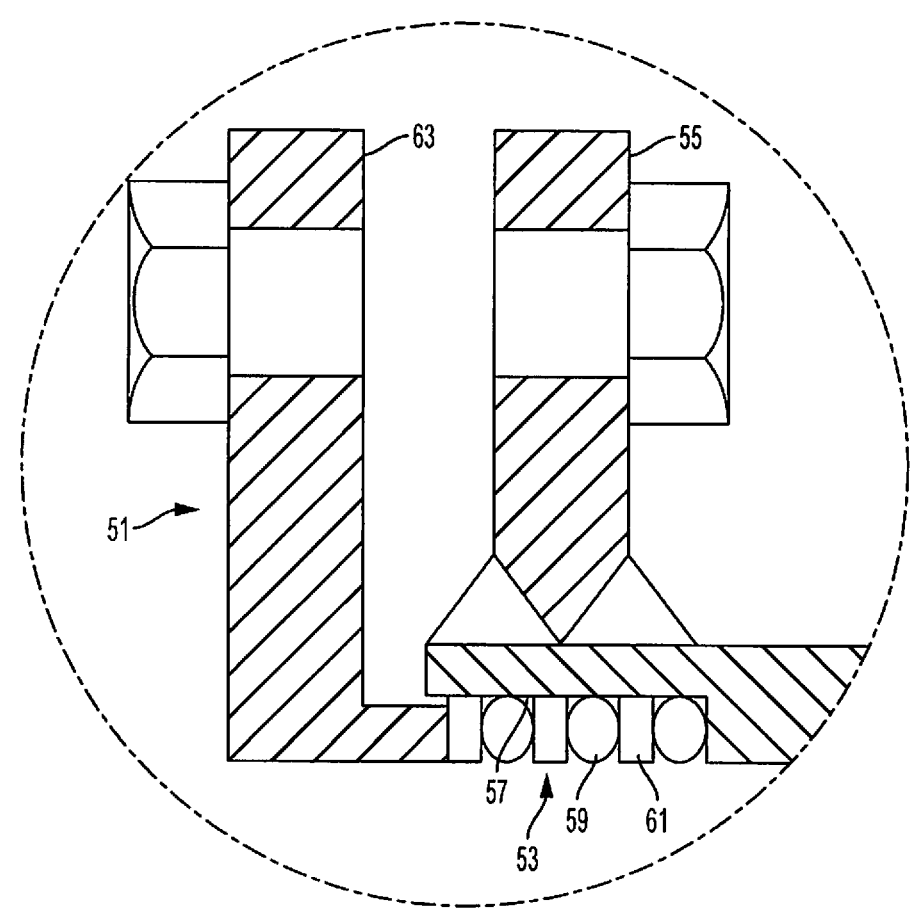
FIG. 5 is an enlarged view of the slip joint adaptor of FIG. 4.

Referring now to FIGS. 3 to 5, in some embodiments, at least one of the inlet and outlet ends 11, 21 includes at least one slip or linearly adjustable pipeline section 30 or 70 spanning between it and a corresponding connection point of the field meter run or main pipeline. The first linearly adjustable pipeline section 30 may be arranged to extend horizontally. For example, the linearly adjustable pipeline section 30 may extend in overall length in a range of about 10 to 25 feet (3.65 to 7.62 meters). The second linearly adjustable pipeline section 70 may be arranged to extend vertically. For example, the linearly adjustable pipeline section 70 may extend in a range of 4 to 7 or 8 feet (1.21 to 2.13 to 2.42 meters), permitting one section 30 to cross over another section 30. When used in combination, the sections 30 and 70 may be connected by an elbow 45 having a lift eye 47. The linearly adjustable pipeline section 70 may also be used to swivel or orient section 30 into a desired clock position or angular orientation.

The linearly adjustable pipeline sections 30, 70 can include an outer pipe 33, an inner pipe 37 housed by and extendable from the outer pipe 33, and means to seal 50 an end 35 of the outer pipe 33 about the inner pipe 37. The inlet or outlet ends 31, 41 of the section 30, 70 may include a lap joint flange 49A, 49B for connection to a corresponding inlet or outlet end 11, 21 of the portable verification system 5 or to the field meter run or main pipeline. In some embodiments, one end 31, 41 is an elbow and the other end 41, 31 is straight. A lift eye 43 may be added to the inlet or outlet end 31, 41.

The means to seal 50 the outer pipe 33 about the inner pipe 37 may be a slip joint 51 that includes a packing gland 53 arranged in a pocket 57 located between a head 55 and follower or pusher 63. In some embodiments, the packing gland 53 includes at least two O-rings 59 with a moveable spacer 61 located in between. As the pusher 63 is drawn toward the head 55, the O-rings 59 become compressed between the head 55 and spacer 61, and between the spacer 61 and pusher 63, and therefore expand into sealing engagement with pipe 37.

Figure 6:
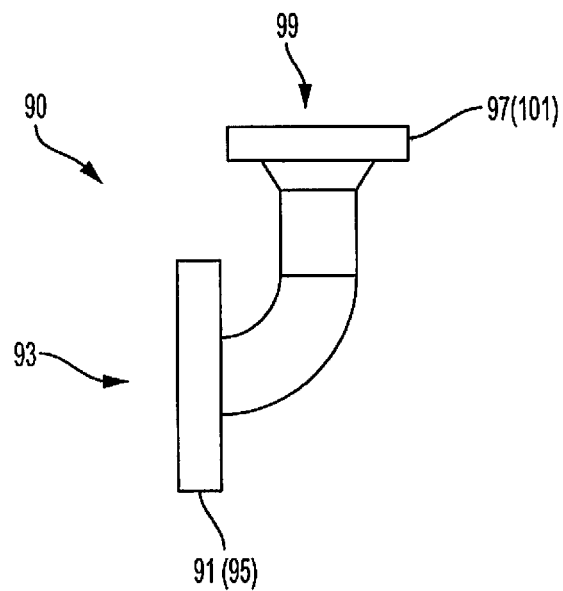
FIG. 6 is a front elevation view of an embodiment of an adaptor fitting that may be used to connect the inlet or outlet end to a corresponding outlet or inlet flange of the meter run or main pipeline, respectively.
Figure 7:
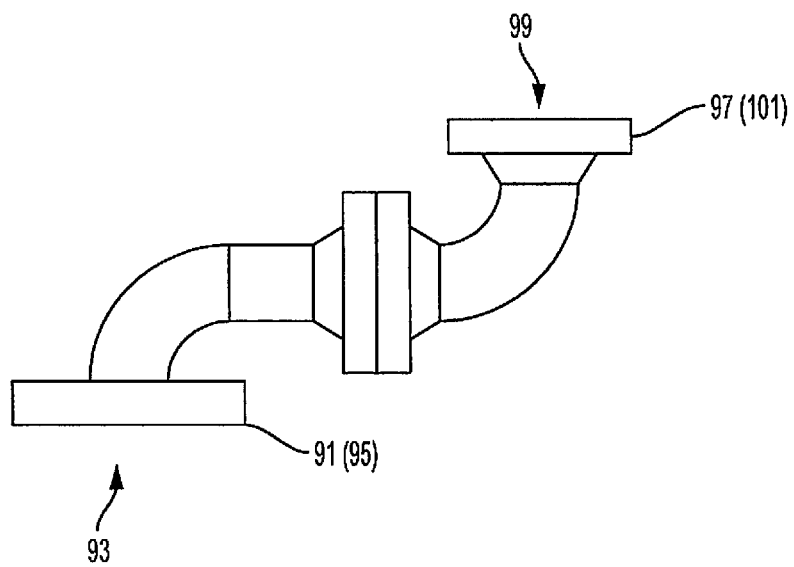
FIG. 7 is a front elevation view of another embodiment of an adaptor fitting. In embodiments, the flange on the meter run or main pipeline side of the fitting may vary from one adaptor to the next with the flange on the portable verification side of the fitting being the same across the different adaptor fittings.

Referring now to FIGS. 6 & 7, because of differences in connection flanges used on meter runs and main pipelines, the portable verification system 5 may also use at least one adaptor fitting 90. In embodiments, adaptor fitting 90 is connectable to the inlet or outlet ends 11, 21 of the portable verification system 5 or to the inlet or outlet ends 31, 41 of the linear adjustable pipeline sections 30, 70. The adaptor fitting 90 may have a first flange 91 at one end 93 having a first bolt hole pattern 95 and a second flange 97 at another end 99 having a second bolt hole pattern 101. The first and second flanges 91, 97 may differ from one another in bolt hole pattern 95, 101, diameter, or bolt hole pattern 95, 101 and diameter.

The first flange 91 may be adapted for connection to the inlet or outlet end 11, 21 (or 31, 41) of system 5, with the second flange 97 adapted for connection to the field meter run or main pipeline side. In other words, first flange 91 can be standard among adaptor fittings 90 but second flange 97 differs. In this way, the portable verification system 5 may be connected to a wide variety of different end treatment and main pipeline flange connections by simply changing the adaptor fitting 90.

Embodiments of a method of verifying a field ultrasonic gas flow meter when connected to a main pipeline transporting a gas include completing a circuit between the measurement section, the portable verification system 5, and the main pipeline; allowing a gas to flow through the field meter M and then through a calibrated ultrasonic gas flow meter 15 of the portable verification system 5; and comparing a volume of gas measured by the two meters M, 15.

Completing the circuit may include extending a first or a second linearly adjustable pipeline section 30, 70 (or both) from at least one of the inlet and outlet ends 11, 21. The method may also include changing a direction of the horizontal linearly adjustable pipeline section 30, for example, by swiveling the vertical linearly adjustable pipeline section 70 into a desired clock position or angle. Section 70 may be used vertically extend from the inlet or outlet ends 11, 21. The method may also include connecting an adaptor fitting 90 between at least one of the inlet end 11 and the downstream end of the measurement section or between the outlet end 21 and the main pipeline. An adaptor fitting 90 may also be used at the inlet or outlet ends 31, 41 of the linear adjustable pipeline sections 30, 70.

The method may also include changing a velocity of the volume of gas flowing through the portable verification system 5 (and therefore through the field meter M) between a first velocity and a second different velocity. The first velocity may be the field velocity. The second different velocity may be a velocity above or below the field velocity. Changing the velocity may be done by way of adjusting a flow control valve 19 located between the calibrated ultrasonic gas flow meter 15 and the outlet end 21 of the portable verification system 5.

Figure 8:
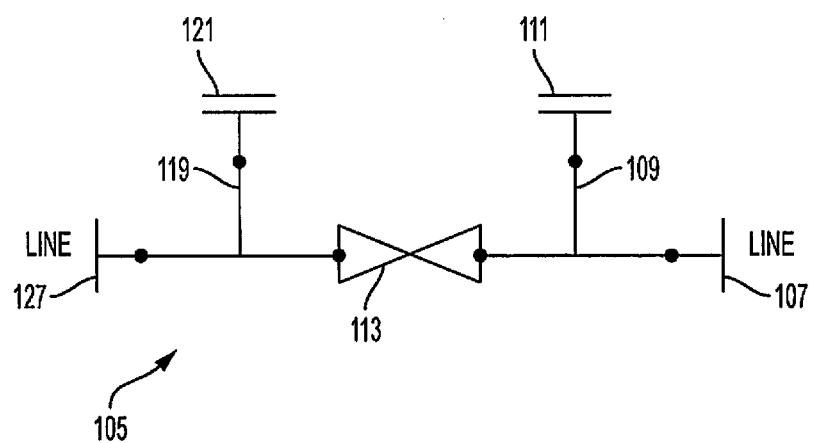
FIG. 8 is a schematic of an embodiment of a quick disconnect to minimize connect and disconnect time to a field meter run.

Referring now to FIG. 8, a quick connect/disconnect 105 may be installed as part of a field meter run or station to eliminate the need for adaptors 90, or the need to remove an end treatment from the field meter run, for connection to the portable verification system 5. In embodiments, the quick connect/disconnect 105 is a permanent part of the main pipeline system, located downstream of the field meter run and configured to prevent flow into the portable verification system 5 during normal meter run or pipeline operations. The quick connect/disconnect 105 allows flow into system 5 when the system 5 is connected to the run 105 during in-field, on-site verification operations.

In embodiments of the quick connect/disconnect 105, a first end 107 is connected to a downstream end of the field meter run and a second end 127 is connected to another downstream end, thereby creating a flow path through isolation device 13 when open (and bypassing the portable verification system 5). Laterals 109, 119 are located on opposite ends of the isolation device 113. Each connection end 111, 121 of the laterals 109, 119 matches and mates to a corresponding one of the inlet and outlet ends 11, 21 of the portable verification system 5. When the quick connect/disconnect 105 is not connected to the ends 11, 21, the ends 111, 121 may be closed with a closure flange of a kind known in the art. The closure flanges are then removed for connection to the ends 11, 21. The ends 11, 111, 21, 121 may be bolted together, clamped, or attached to one another using fastening or clamping means known in the art.

The isolation device 113—which may be a ball valve, a gate valve, an orifice fitting, a spectacle blind valve, or the like—is located between the two connection ends 111, 121. When the isolation device 113 is in an open position, product flow bypasses the portable verification system 5. When the isolation device 113 is in a closed position, flow is diverted from the main pipeline's meter run or station into the first lateral 109, into the portable verification system 5, then into the second lateral 119 and back into the main pipeline. The laterals 109, 119 may each include an isolation device (not shown) of a kind similar to that of device 113 that, when closed, prevents flow to the ends 111, 121.

Figure 9:
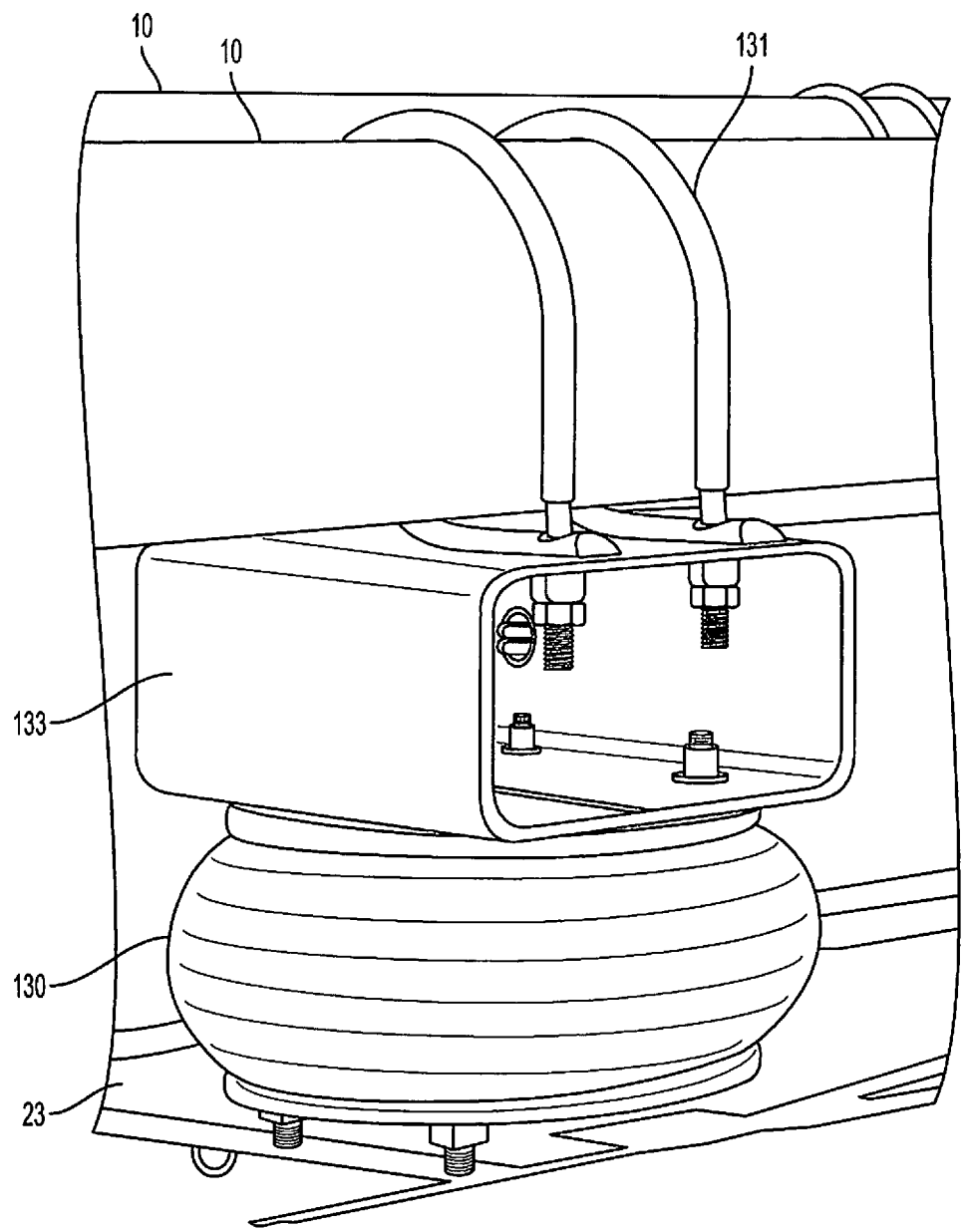
FIG. 9 is an isometric view of an embodiment of an air spring arrangement used to connect the reference meter run piping to a trailer and provide shock absorption, positioning adjustment of the rigid piping relative to the trailer, and height adjustment.

Referring now to FIG. 9, in embodiments the portable piping system 5 includes a plurality of pneumatic suspension devices or air springs 130 located between portions of piping 10 of the reference meter run 13 and the measurement trailer 23. Truck or trailer application air springs are a suitable air spring 130. The air springs 130—which may be connected to the piping by a U-bolt 131 and bracket 133 combination—"float" the piping 10 above the trailer 23 and provide shock absorption, positioning adjustment of the rigid piping 10 relative to the trailer 23, and height adjustment of the piping 10. For example, one portion of the piping 10 may be lowered and another raised. The air springs 130 may be in communication with a pneumatic control system (not shown) to lower or raise the height of the air springs 120. The measurement trailer 23 may, in addition to the air springs 130, include air springs as part of the suspension system of the trailer 23.

The embodiments that have been described here provide illustrative examples. Modifications may be made in the details of construction without departing from this disclosure. The disclosure extends to all functionally equivalent structures, methods, and uses that fall within the scope of the following claims. The claims include the full range of equivalency to which each of the recited elements or steps are entitled.

What is claimed is:

1. A portable verification system used to verify an in-field gas flow meter, the portable verification system comprising:
   a trailer (23);
   a reference meter section (13) independent of the in-field gas flow meter and mounted on the trailer, the reference meter section having piping (10) including an inlet end (11) connectable to a downstream end of a meter run of a main pipeline, an outlet end (13) connectable to the main pipeline, and an ultrasonic gas flow reference meter (15) located between the inlet and outlet ends; and
   a plurality of air springs (130) located between the trailer and the reference meter section, the piping of the reference meter section connected to the plurality of air springs.

2. A portable verification system according to claim 1 further comprising the reference meter section including a flow control valve (19) located between the ultrasonic gas flow reference meter and the outlet end.

3. A portable verification system according to claim 1 further comprising at least one of the inlet and outlet ends including a linearly adjustable pipeline section (30, 70).

4. A portable verification system according to claim 3 further comprising the linearly adjustable pipeline section including an outer pipe (33), an inner pipe (37) housed by and extendable from the outer pipe, and means to seal (50) an end (35) of the outer pipe about the inner pipe.

5. A portable verification system according to claim 4 further comprising the means to seal including a slip joint (51).

6. A portable verification system according to claim 5 wherein the slip joint includes a packing gland (53).

7. A portable verification system according to claim 6 wherein the slip joint includes a pocket (57) and a packing gland pusher (63).

8. A portable verification system according to claim 7 further comprising the pocket including at least two O-rings (59) and a spacer ring (61) located between the at least two O-rings.

9. A portable verification system according to claim 1 further comprising at least one of the inlet and outlet ends including an adaptor fitting (90), the adaptor fitting comprising a first flange (91) at one end (93) and a second flange (97) at another end (99), the first and second flanges differing from one another in bolt hole pattern (95), diameter, or bolt hole pattern and diameter.

10. A portable verification system according to claim 1 further comprising the portable verification system including at least one turn (17) between the inlet and outlet ends.

11. A portable verification system according to claim 1 further comprising a quick connect/disconnect (105), the quick connect/disconnect including:
    a first lateral (109) including an outlet end (111) connectable to the inlet end (11) of the reference meter section (13);
    a second lateral (119) including an inlet end (121) connectable to the outlet end (21) of the reference meter section; and
    an isolation device (113) configured to divert flow into the first lateral, through the portable verification system, and into the second lateral.

12. A method of verifying an in-field gas flow meter of a meter run connected to a main pipeline when transporting a gas, the method comprising:
    completing a circuit between the meter run, a portable verification system (5), and the main pipeline; and
    permitting a gas to flow from the main pipeline through the meter run and into and through the portable verification system and back into the main pipeline;
    the portable verification system comprising:
    a trailer (23);
    a reference meter section (13) independent of the in-field gas flow meter and mounted on the trailer, the reference meter section having piping (10) including:
        an inlet end (11) connectable to a downstream end of the meter run,
        an outlet end (21) connectable to the main pipeline, and
        an ultrasonic gas flow reference meter (15) located between the inlet and outlet ends; and
    a plurality of air springs (130) located between the flatbed trailer and the reference meter section, piping of the reference meter section connected to the plurality of air springs.

13. A method according to claim 12 further comprising changing a velocity of gas flowing through the portable verification system between a first velocity and a second different velocity.

14. A method according to claim 13 wherein the changing the velocity is by way of adjusting a flow control valve (19) located between the ultrasonic reference gas flow meter and the main pipeline.

15. A method according to claim 12 further comprising the completing the circuit to include extending a linearly adjustable pipeline section (30, 70) from at least one of the inlet and outlet ends of the portable verification system.

16. A method according to claim 15 further comprising changing a direction of the linearly extendable pipeline section relative to the inlet or outlet end.

17. A method according to claim 15 wherein the linearly adjustable pipeline section includes an outer pipe (33), an inner pipe (37) housed by and extendable from the outer pipe, and means to seal (50) an end of the outer pipe about the inner pipe.

18. A method according to claim 12 further comprising the completing circuit to include connecting an adaptor fitting (90) between at least one of the inlet end and the downstream end of the measurement section and between the outlet end and the main pipeline.

19. A method according to claim 18 wherein the adaptor fitting includes a first flange (91) at one end (93) and a second flange (97) at another end (99), the first and second flanges differing from one another in bolt hole pattern (101), diameter, or bolt hole pattern and diameter.

20. A method according to claim 12 further comprising the completing circuit to include changing a height, a planar orientation, or a height and planar orientation of at least one of the inlet and outlet ends.

21. A method according to claim 12 further comprising disconnecting the portable verification system from the measurement section and the main pipeline.

* * * * *